UNITED STATES PATENT OFFICE.

JOHANN BAMMANN AND MORITZ ULRICH, OF ELBERFELD, GERMANY, ASSIGNORS TO THE FARBENFABRIKEN, VORMALS FR. BAYER & CO., OF SAME PLACE.

BLUE TETRAZO DYE.

SPECIFICATION forming part of Letters Patent No. 498,874, dated June 6, 1893.

Application filed June 11, 1892. Serial No. 436,395. (Specimens.) Patented in England August 26, 1890, No. 13,443; in Austria-Hungary November 28, 1890, No. 35,494 and No. 58,417; in France December 6, 1890, No. 210,033, and in Italy April 27, 1891, XXV, 29,631, LVIII, 100.

*To all whom it may concern:*

Be it known that we, JOHANN BAMMANN and MORITZ ULRICH, doctors of philosophy, subjects of the Emperor of Germany, residing at Elberfeld, Prussia, Germany, (assignors to the FARBENFABRIKEN, VORMALS FR. BAYER & CO., of Elberfeld,) have invented a new and useful Improvement in the Manufacture of Amido-Naphthol Disulpho-Acids, (for which the aforesaid FARBENFABRIKEN has already obtained Letters Patent in England, No. 13,443, dated August 26, 1890; in France, No. 210,033, dated December 6, 1890; in Italy, Vol. XXV, 29,631, Vol. LVIII, 100, dated April 27, 1891, and in Austria-Hungary, No. 35,494 and No. 58,417, dated November 28, 1890,) of which the following is a full, clear, and exact description.

Our invention relates to the production of a new tetrazo dye-stuff by combining one molecular proportion of tetrazo orthodiphenol-ether with two molecular proportions of the sodium salt or other alkaline salt of the so called 1.8-amidonaphthol-beta-disulpho acid which we have claimed in a separate application, Serial No. 432,495, and which may be produced by reducing the mononitro derivative of the naphthalenetrisulpho acid the latter being described in the German Patent No. 38,281, dated September 2, 1885, and melting with alkalies at temperatures from about 180° to 190° centigrade the resulting naphthylaminetrisulpho acid or by treating with diluted acids or alkalies the diamidonaphthalenedisulpho acid which is produced by dinitrating the so called alpha naphthalene disulpho acid of Ebert and Merz and reducing the dinitro compound thus obtained.

In carrying out our process practically we proceed as follows: 24.4 kilos, by weight, of diamido ortho diphenolether (dianisidine) are dissolved in about three hundred and seventy-five liters of water and fifty kilos of muriatic acid. This solution cooled by ice is slowly mixed with a solution in water of fourteen kilos, by weight, of sodium nitrite in order to produce the tetrazochloride of the aforesaid diamido ortho diphenoldimethylether. The formation of the tetrazochloride is immediately finished and the tetrazo solution thus obtained is allowed to flow slowly into the cooled watery solution of 72.6 kilos, by weight, of the sodium salt of the 1.8-amidonaphthol-beta-disulpho acid above described and of a large excess of sodium carbonate taking care that the liquid remains alkaline during the whole operation. The formation of the dye-stuff is finished after about forty-eight hours. The latter separates for the most part and the rest thereof which remains in solution is precipitated by adding common salt. The complete coloring-matter is isolated in the usual manner by filtering off, pressing and drying.

Our new dye-stuff which corresponds according to its production to the formula:

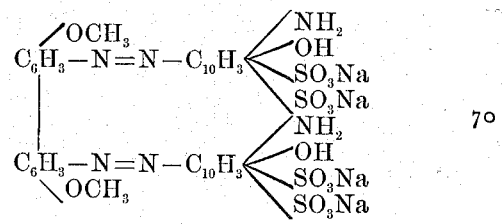

possesses the following properties: It forms when finely pulverized a reddish-black powder which dissolves in water with greenish-blue color, in sodium carbonate and ammonia liquid with the same color and in soda-lye with violet color. Its solutions in water do not change in color when they are mixed with sodium carbonate or ammonia liquid, only on the addition of soda-lye in a great excess the blue color changes into a violet or reddish-blue. On adding strong mineral acids to its solutions in water the blue color is not changed. Out of its watery solutions it is precipitated as a dark-blue fine precipitate on the addition of common salt. It dissolves in concentrated sulphuric acid with bluish-green color and on adding water to the sulphuric acid solution the latter assumes at first a pure blue color and after some time a fine dark blue precipitate separates. It produces on unmordanted cotton in alkaline soap baths a brilliant greenish-blue which is fast against alkalies.

Our new dye-stuff differs by its composition from the similar products which we have claimed in a separate application, Serial No. 436,396, and which possess the following compositions:

$$C_6H_4-N=N-C_{10}H_3 \begin{cases} NH_2 \\ OH \\ SO_3Na \\ SO_3Na \end{cases}$$
$$| $$
$$C_6H_4-N=N-C_{10}H_3 \begin{cases} NH_2 \\ OH \\ SO_3Na \\ SO_3Na \end{cases}$$

and $$CH_3{\diagdown}C_6H_3-N=N-C_{10}H_3 \begin{cases} NH_2 \\ OH \\ SO_3Na \\ SO_3Na \end{cases}$$
$$|$$
$$C_6H_3(CH_3)-N=N-C_{10}H_3 \begin{cases} NH_2 \\ OH \\ SO_3Na \\ SO_3Na \end{cases}$$

as the latter two products are obtained by combining one molecular proportion of either tetrazo diphenyl chloride or tetrazoditolyl chloride with two molecular proportions of the 1.8-amidonaphthol-beta-sulpho acid above specified and it differs also from the said two coloring-matters by its dyeing properties as our new dye-stuff produces on unmordanted cotton shades which are more greenish-blue than those obtained by means of the said two dye-stuffs resulting from tetrazodiphenyle chloride or tetrazoditolyle chloride. It differs also from the product claimed by us in a separate application and obtained by the combination of one molecular proportion of tetrazomonoethoxydiphenyl chloride with two molecular proportions of the said 1.8-amidonaphthol-beta-disulpho acid as the latter dye-stuff according to its formation possesses the following formula:

$$C_6H_4-N=N-C_{10}H_3 \begin{cases} NH_2 \\ OH \\ SO_3Na \\ SO_3Na \end{cases}$$
$$|$$
$$C_6H_3(OC_2H_5)-N=N-C_{10}H_3 \begin{cases} NH_2 \\ OH \\ SO_3Na \\ SO_3Na \end{cases}$$

Having now described our invention and in what manner it can be performed, that which we claim as new, and desire to secure by Letters Patent, is—

1. The process of producing a blue tetrazo dye-stuff by the combination of one molecular proportion of the tetrazo chloride of orthodiphenolether with two molecular proportions of the 1.8-amidonaphthol-beta-disulpho-acid or its salts in alkaline solution.

2. As a new product the tetrazo dye-stuff having the formula:

$$OCH_3{\diagdown}C_6H_3-N=N-C_{10}H_3 \begin{cases} NH_2 \\ OH \\ SO_3Na \\ SO_3Na \end{cases}$$
$$|$$
$$C_6H_3(OCH_3)-N=N-C_{10}H_3 \begin{cases} NH_2 \\ OH \\ SO_3Na \\ SO_3Na \end{cases}$$

which is when finely pulverized a reddish-black powder which dissolves in water with greenish-blue color, in sodium carbonate and ammonia liquid with the same color and in soda-lye with violet color; its solutions in water do not change in color when they are mixed with sodium carbonate or ammonia liquid, only on the addition of soda-lye in a great excess the blue color is changed into a violet or reddish-blue; on adding strong mineral acids to its solutions in water the blue color is not changed; out of its watery solutions it is precipitated as a dark-blue fine precipitate on the addition of common salt; it dissolves in concentrated sulphuric acid with bluish-green color and on adding water to the sulphuric acid solution the latter assumes at first a pure blue color and after some time a fine dark blue precipitate is separating; it dyes unmordanted cotton in alkaline soap baths a brilliant greenish-blue which is fast against alkalies.

In testimony whereof we have signed our names in the presence of two subscribing witnesses.

JOHANN BAMMANN.
MORITZ ULRICH.

Witnesses:
RUDOLPH FRICKE,
WM. ESSENWEIN.

It is hereby certified that in Letters Patent No. 498,874, granted June 6, 1893, upon the application of Johann Bammann and Moritz Ulrich, of Elberfeld, Germany, for an improvement in "Blue Tetrazo Dyes," an error appears in the printed specification requiring the following correction, viz.: In line 9, page 1, the words "Amido-Naphthol Disulpho-Acids" should be stricken out and the words *Direct Dyeing Coloring Matters* inserted instead; and that the said Letters Patent should be read with this correction therein that the same may conform to the record of the case in the Patent Office.

Signed, countersigned, and sealed this 11th day of July, A. D. 1893.

[SEAL.]

JNO. M. REYNOLDS,
*Assistant Secretary of the Interior.*

Countersigned:
    JOHN S. SEYMOUR,
        *Commissioner of Patents.*